United States Patent
Nonnet et al.

(10) Patent No.: US 9,309,144 B2
(45) Date of Patent: Apr. 12, 2016

(54) GLASS COMPOSITIONS FOR GASKETS OF APPARATUSES OPERATING AT HIGH TEMPERATURES AND ASSEMBLING METHOD USING THEM

(75) Inventors: Hélène Nonnet, Sarrians (FR); Agnès Grandjean, Saint Marcel de Careiret (FR); Charlène Vallat, Saint-Genies de Comolas (FR); Daniel Coillot, Oignies (FR); Lionel Montagne, Laventie (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 813 days.

(21) Appl. No.: 13/380,415

(22) PCT Filed: Jun. 29, 2010

(86) PCT No.: PCT/EP2010/059236
§ 371 (c)(1),
(2), (4) Date: Aug. 31, 2012

(87) PCT Pub. No.: WO2011/000847
PCT Pub. Date: Jan. 6, 2011

(65) Prior Publication Data
US 2012/0318022 A1    Dec. 20, 2012

(30) Foreign Application Priority Data
Jul. 3, 2009 (FR) ..................... 09 54613

(51) Int. Cl.
C03C 3/091 (2006.01)
C03C 3/076 (2006.01)
C03C 3/095 (2006.01)
C03C 8/24 (2006.01)
C25B 9/18 (2006.01)
H01M 8/02 (2006.01)
C03C 10/00 (2006.01)

(52) U.S. Cl.
CPC .................. *C03C 3/091* (2013.01); *C03C 3/076* (2013.01); *C03C 3/095* (2013.01); *C03C 8/24* (2013.01); *C03C 10/0009* (2013.01); *C03C 10/0018* (2013.01); *C25B 9/18* (2013.01); *H01M 8/0282* (2013.01); *Y02E 60/50* (2013.01); *Y02P 70/56* (2015.11)

(58) Field of Classification Search
CPC ........ C03C 3/091; C03C 3/076; C03C 3/095; C03C 8/24; C03C 10/0009; C03C 10/0018; C25B 9/18; H01M 8/0282; Y02E 60/50

USPC ................... 501/15, 55, 64, 66; 429/452–470
See application file for complete search history.

(56) References Cited

U.S. PATENT DOCUMENTS

| | | |
|---|---|---|
| 4,921,738 A | 5/1990 | Cassidy |
| 5,196,277 A | 3/1993 | Mima et al. |
| 6,430,966 B1 | 8/2002 | Meinhardt et al. |
| 6,828,263 B2 | 12/2004 | Larsen et al. |
| 2003/0040420 A1 | 2/2003 | Larsen et al. |
| 2008/0142148 A1 | 6/2008 | Nielsen et al. |

FOREIGN PATENT DOCUMENTS

| | | |
|---|---|---|
| JP | 3 177332 A | 8/1991 |
| WO | 9605626 | 2/1996 |
| WO | 9954131 | 10/1999 |
| WO | 2006069753 | 7/2006 |

OTHER PUBLICATIONS

Eichler, K. et al., BAS (BaO Al2 O3 SiO2)—glasses for High Temperature Applications. Journal of the European Ceramic Society, vol. 19, pp. 1101-1104, 1999.
Lahl, N. et al., Crystallisation kinetics in AO—Al2O3—SiO2—B2O3 glasses (A=Ba,Ca,Mg). Journal of Materials Science, vol. 35, pp. 3089-3096, 2000.
Loehman, R., et al., Engineered Glass Composites for Sealing Solid Oxide Fuel Cells. Presentation 2004.
Yang, Z., et al., Chemical interactions of barium—calcium—aluminosilicate-based sealing glasses with oxidation resistant alloys. Solid State Ionics, vol. 160, pp. 213-225, 2003.
Zheng, R., et al., SiO2—CaO-B2O3—Al2O3 ceramic glaze as sealant for planar ITSOFC. Journal of Power Sources, vol. 128, pp. 165-172, 2004.
International Search Report issued on Jun. 1, 2010 for International Application No. PCT/EP2010/059236.

*Primary Examiner* — Anthony J Green
*Assistant Examiner* — Elizabeth A Bolden
(74) *Attorney, Agent, or Firm* — Knobbe Martens Olson and Bear LLP

(57) ABSTRACT

A glass composition, characterized in that it is selected from the group consisting of: a glass composition (A) with the following molar percentages: 70 to 76% of $SiO_2$, 7 to 8% of $B_2O_3$, 5 to 6% of $Al_2O_3$, and 10 to 17% of $Na_2O$; and a glass composition (B) with the following molar percentages: 63 to 76% of $SiO_2$, 5 to 12% of $ZrO_2$, 0 to 12% of $B_2O_3$, 0 to 2% of $La_2O_3$, 11 to 14% of $Na_2O$, and 3 to 5% of $K_2O$. The glass composition can be used in a method for assembling parts, in particular for a method of manufacturing high-temperature electrolyzers (HTEs) or high-temperature fuel cells (SOFCs).

19 Claims, 10 Drawing Sheets

GLASS COMPOSITIONS FOR GASKETS OF APPARATUSES OPERATING AT HIGH TEMPERATURES AND ASSEMBLING METHOD USING THEM

RELATED APPLICATIONS

This application is a U.S. National Phase of International Application No. PCT/EP2010/059236, filed Jun. 29, 2010, designating the U.S., and published in French as WO 2011/000847 on Jan. 6, 2011 which claims the benefit of French Patent Application No. 0954613 filed Jul. 3, 2009.

BACKGROUND OF THE INVENTION

1. Field of the Invention

The invention relates to glass compositions, and more particularly to glass compositions for gaskets, seals of apparatuses operating at high temperatures, for example from 600 to 1000° C. notably from 700 to 900° C.

More specifically, the invention relates to glass compositions for gaskets, seals of a high temperature electrolyzer (<<HTE>>) or of a high temperature fuel cell (Solid Oxide Fuel Cell or SOFC) comprising a stack of elementary cells.

The invention further relates to a method for assembling at least two parts by applying said glass compositions. These parts are notably parts which enter the structure of a high temperature electrolyzer or of a high temperature fuel cell (Solid Oxide Fuel Cell or SOFC).

The technical field of the invention may thus be generally defined as that of glass gaskets, the function of which is to ensure the seal between the different compartments of apparatuses in which fluids are conveyed at high temperatures. More particularly, the technical field of the invention is that of glass gaskets ensuring the seal between the different compartments in which gases are transported and produced in high temperature electrolyzers or high temperature fuel cells, notably those comprising a stack of elementary cells which generally operate between 600 and 1,000° C., in particular between 700° C. and 900° C.

2. Description of the Related Art

In high temperature electrolyzers, electrolysis of water at a high temperature is performed from vaporized water. The function of a high temperature electrolyzer is to transform steam into hydrogen and oxygen according to the following reaction: $2H_2O_{(g)} \rightarrow 2H_2 + O_2$.

This reaction is conducted via an electrochemical route in the cells of the electrolyzer.

Each elementary cell, as shown in FIG. 1, consists of two electrodes, i.e. an anode (1) and a cathode (2), sandwiching a solid electrolyte generally in the form of a membrane (3).

Both electrodes (1, 2) are electron conductors and the electrolyte (3) is an ion conductor.

The electrochemical reactions occur at the interface between each of the electron conductors and the ion conductor.

At the cathode (2), the half reaction is the following:
$2H_2O + 4\,e^- \rightarrow 2H_2 + 2O^{2-}$;

And at the anode (1) the half reaction is the following:
$2O^{2-} \rightarrow O_2 + 4e^-$.

The electrolyte (3) placed between both electrodes is the migration location of the $O^{2-}$ ions (4) under the effect of the electric field generated by the potential difference imposed between the anode (1) and the cathode (2).

An elementary reactor, illustrated in FIG. 2, consists of an elementary cell (5) as described above, with an anode (1), an electrolyte (3), and a cathode (2) and of two monopolar connectors or more exactly two half-interconnectors (6, 7) which ensure electrical, hydraulic and thermal functions. This elementary reactor is called a module.

In order to increase the produced hydrogen and oxygen flow rates, and as this is shown in FIG. 3, several elementary modules are stacked (8), the cells (5) then being separated by interconnectors or bipolar interconnection plates (9).

The assembly of the modules (8) is positioned between two upper (10) and lower (11) interconnection plates which bear electric power supplies and gas supplies (12). This is then referred to as a stack (FIG. 3).

There exist two designs, configurations, architectures for the stacks:
  tubular stacks, in which the cells are tubes, and
  planar stacks, in which the cells are made in the form of plates like in FIG. 3.

In the planar architecture, the cells and the interconnectors are in contact in many points. The manufacturing of the stack is subject to fine tolerances as to the flatness of the cells in order to avoid too high contact pressures and inhomogeneous distribution of the stresses, which may lead to cracking of the cells.

The seal gaskets in a stack have the purposes of preventing a hydrogen leak from the cathode to the neighboring anodes, of preventing an oxygen leak from the anode towards the neighboring cathodes, of preventing a hydrogen leak towards the outside of the stack and finally of limiting the steam leaks from the cathodes towards the anodes.

Within the scope of stack development for high temperature electrolysis (<<THE>>), and as this is shown in FIG. 4, gas-proof gaskets (13) are thereby made between the planar electrolysis cells (5), each consisting of an anode/electrolyte/cathode ceramic trilayer, and the metal interconnectors or interconnection plates (9).

It should be noted that the dimensions given in μm in FIG. 4 are only given as examples.

More specifically, a gasket is made between the lower surface of each cell (5) and the upper half-interconnector (14) of the interconnection plate located below the cell on the one hand, and between the upper surface of each cell and the lower half-interconnector (15) of the interconnection plate located above the cell (5) on the other hand.

These gaskets (13) generally have to have a leak rate in air of less than $10^{-3}$ NmL/min/mm between 700° C. and 900° C. under a pressure difference from 20 to 500 mbars.

In addition to this seal function, the gasket may in certain cases have secondary assembling and electric conduction functions. For certain stack architectures, a ceramic part, called a cell support, may be placed between the cells and the interconnectors; and gas-proof gaskets are then also required with this cell supporting part.

Several seal solutions are presently investigated, i.e.: cements or ceramic adhesives, glasses or vitroceramics gaskets, metal compressive gaskets, mica compressive gaskets, brazed gaskets and mixed solutions resorting to several of these techniques.

These gaskets should give the possibility of ensuring the seals between the cathode chamber and the outside, between the anode chamber and the outside, and between both chambers, and thereby avoiding gas leaks between both chambers and towards the outside.

As this has already been specified above, we are most particularly interested in glass gaskets herein.

The glasses used for these gaskets may either be made of a simple glass, or of a crystallizable glass also called a vitroceramic, or further a mixture of both of these glasses, or further a simple glass to which are added ceramic particles.

Most glasses used for these gaskets are generally in solid form at the temperature of use i.e. generally between 600° C. and a 1,000° C., notably between 700° C. and 900° C., for example 850° C. These gaskets are described as <<hard>> gaskets and generally have a viscosity of more than 109 Pa·s at 850° C.

The main constraint to be observed in this situation is to formulate a gasket having a thermal expansion coefficient <<TEC>>, adapted to the other elements of the junction, notably to the ceramic and metal parts.

As regards simple glasses, $SiO_2$—$CaO$—$B_2O_3$—$Al_2O_3$ compositions are studied in document [1], $BaO$—$Al_2O_3$—$SiO_2$ compositions are described in document [2] and in document [3], and finally $LiO_2$—$Al_2O_3$—$SiO_2$ compositions are mentioned in document [4], but with these compositions it is difficult to attain TECs adapted to the junctions.

Vitroceramic glasses are as for them generally shown as being more chemically and mechanically resistant thanks to the control of the crystallization of the glass by means of nucleating agents and particular heat treatments.

The parameters to be controlled for these vitroceramic glasses are the formulation of the glass and the heat cycles in order to manage formation of the crystalline phase(s) having the sought properties.

Thus, vitroceramic glass compositions of the LAS ($LiO_2$—$Al_2O_3$—$SiO_2$) type are described in document [4], compositions of the BAS ($BaO$—$Al_2O_3$—$SiO_2$) type are studied in documents [2] and [6], compositions of the BCAS (Barium Calcium AluminoSilicate) type are mentioned in documents [7] and [8], and finally $SiO_2$—$CaO$—$MgO$—$Al_2O_3$ compositions are the subject of document [9].

However, development of the formulations and of the heat treatments for vitroceramic glasses remains delicate since the junction material changes over time, with modification of the crystalline phases and because of the creation of interfaces between the materials in contact. Industrial development of this type of vitroceramic glasses therefore remains complex.

Finally, by adding ceramic particles of different sizes and shapes to simple glasses it is possible to control and adjust the viscosity and the TEC of the sealing material [10, 11]. The delicate point lies in the presence of a glassy phase in a large amount which may pose high temperature corrosion or evaporation problems.

In addition to the <<hard>> gaskets described above which appear in solid form at the operating temperature, $SrO$—$La_2O_3$—$Al_2O_3$—$B_2O_3$—$SiO_2$ compositions with which a fluid condition of the glass may be obtained at the operating temperatures, are disclosed in document [5]. With these compositions, it is possible to accommodate the large TEC differences, but the formulations developed in this document do not seem to be sufficiently resistant from a mechanical point of view, exactly because of this too large fluidity of the glass, in order to be able to maintain the seal against the imposed pressure differences.

Document [12] describes a sodium-sulfur cell which comprises a solid electrolyte tube, an insulating ring which electrically insulates a positive electrode compartment from a negative electrode compartment, and a gap from 100 to 500 μm between the solid electrolyte tube and the insulating ring and a glass solder which fills this gap in order to attach the insulating ring to the electrolyte tube.

In order to achieve the assembling between the solid electrolyte tube and the insulating ring, the lower portion of the electrolyte tube is inserted into the insulating ring, a glass ring is inserted into the gap formed between the solid electrolyte tube and the insulating ring, this is then heated and the glass ring is melted in an electric oven.

The brazing glass is an alumino-borosilicate glass, for example comprising the 4 following ingredients in % by weight:
 0 to 80% by weight of $SiO_2$;
 0 to 30% by weight of $Al_2O_3$;
 0 to 80% by weight of $B_2O_3$;
 and 0 to 30% by weight of $Na_2O$.

Examples of brazing glasses $SiO_2/Al_2O_3/B_2O_3/Na_2O$ are given in Table 1 of document [12]. It should be noted that the compositions of the glasses of Table 1 are expressed in % by weight.

Further, it is noted that the composition E of Table 1 is not normalized to 100 and consequently any comparison with this composition of document [12] is impossible.

The claimed composition (A) differs from compositions of this document, in particular as regards the $B_2O_3$ content.

Further, the glasses described in U.S. Pat. No. 5,196,277 [12] are welding glasses for low temperature sealing applications, unlike the claimed compositions (A) and (B) which are specifically formulated for high temperature sealing applications and which have properties, in particular viscosity properties but also low reactivity properties towards the materials in contact, suitable for this application.

It emerges from the foregoing that presently there does not exist any glass composition which is satisfactory for a use in seal gaskets for apparatuses operating at high temperature such as high temperature electrolyzers or high temperature fuel cells.

Therefore, there exists a need for a glass composition which gives a chemically and mechanically resistant gasket, notably having mechanical properties allowing it to be adapted to the occasionally very different TECs of the materials to be assembled.

There also exists a need for a glass composition which is not subject to high temperature corrosion or evaporation phenomena.

There is further a need for such a glass composition which has no or few interactions with the materials to be assembled.

Additionally, there exists a need for a glass composition which may be prepared reliably, easily and reproducibly without resorting notably to complex heat cycles.

Finally there exists a need for such a glass composition, all the properties of which remain stable over time in particular under high temperature conditions.

SUMMARY OF THE INVENTION

The goal of the present invention is to provide a glass composition which i.a. meets the needs listed above.

The goal of the present invention is further to provide a glass composition which does not have the drawbacks, defects, limitations and disadvantages of the glass compositions of the prior art and which solves the problems of the compositions of the prior art.

This goal and further other ones are achieved, according to the invention with a glass composition characterized in that it is selected from the group consisting of a glass composition (A) consisting, in molar percentages of:
 70 to 76% of $SiO_2$;
 7 to 8% of $B_2O_3$;
 5 to 6% of $Al_2O_3$;
 10 to 17% of $Na_2O$;
and of a glass composition (B) consisting, in molar percentages of:
 63 to 76% of $SiO_2$;
 5 to 12% of $ZrO_2$;
 0 to 12% of $B_2O_3$;

0 to 2% of $La_2O_3$;
11 to 14% of $Na_2O$;
3 to 5% of $K_2O$.

It is quite obvious that the total of the constituents of the each of the glass compositions according to the invention is equal to 100% in molar percentages.

The compositions of glasses according to the invention may be defined as compositions of simple glass, i.e. they comprise no or little crystalline phase, they only consist of a glass phase at the end of their elaboration and before any (other) heat treatment, before being maintained at a high temperature.

Further, generally, the glass compositions according to the invention further comprise less than 50% by weight of crystalline phase and preferably 0% by weight of crystalline phase after their being maintained at a temperature from 600 to 1,000° C., notably from 700° C. to 900° C. during a period of more than 1 hour.

In other words, the glass compositions according to the invention, and the gaskets comprising these compositions also remain of a glassy nature, i.e. they exhibit little or no crystallization of the glass, after maintaining the gasket at high temperatures such as at the operating temperatures of high temperature electrolyzers or fuel cells which generally are from 600° C. to 1,000° C., notably from 700° C. to 900° C., and for example from 800° C. to 850° C., even for long periods which may for example range up to 1 month or 720 hours.

The compositions according to the invention may thus be defined as <<non-devitrifying>> compositions, i.e. compositions which remain in their initial essentially glassy state, even after exposure to high temperatures.

Further, the compositions according to the invention are such that their viscosity is located in the range from $10^7$ to $10^8$ dPa·s, in the range from 700° C. to 900° C., which allows the glass to be in a visco-plastic state imparting some flexibility to the gasket so as to be able to adapt to the thermal expansion coefficients of the different materials with which it is in contact on the one hand, and satisfactory rigidity so as to be able to support the imposed pressure differences between the different compartments on the other hand. Surprisingly, the glass compositions according to the invention thereby ensure an optimum balance between flexibility and rigidity.

Further the compositions according to the invention also have a low interaction level with the materials with which they are in contact whether these are ceramics such as ceramics of the <<YSZ>> or <<MACOR®>> type; metals and alloys such as steels with high chromium-content (Crofer®), nickel alloys with high chromium-content (Haynes® 230); or still further electrolytes such as the electrolyte of the LSM type; or further cermets such as Ni cermet.

The excellent properties of the compositions according to the invention are highly stable over time, for periods which may attain up to one month, at high temperature, for example from 600° C. to 1,000° C., and notably from 700° C. to 900° C.

The compositions according to the invention are not described in the prior art as illustrated by the documents mentioned above, do not have the defects and drawbacks of the compositions of the prior art and provide a solution to the problems of the compositions of the prior art.

The glass transition temperature of the compositions according to the invention is generally below the preferred operating temperatures of high temperature electrolyzers or fuel cells which are generally from 700° C. to 900° C., and for example from 800° C. to 850° C.

Thus, the glass transition temperatures of compositions (A) are generally from 580° C. to 620° C., while the glass transition temperatures of the compositions (B) are generally from 600° C. to 680° C.

Advantageously, the composition <<A>> consists of, in molar percentages:
72.3% of $SiO_2$;
7.8% of $B_2O_3$;
14% of $Na_2O$;
5.9% of $Al_2O_3$;
or else of:
74.3% of $SiO_2$;
7.8% of $B_2O_3$;
12% of $Na_2O$;
5.9% of $Al_2O_3$.

Advantageously, the composition <<B>> consists of, in molar percentages:
66% of $SiO_2$;
5.1% of $B_2O_3$;
13.4% of $Na_2O$;
4.4% of $K_2O$;
10.1% of $ZrO_2$;
1% of $La_2O_3$;
or else of:
74.9% of $SiO_2$;
12.9% of $Na_2O$;
4.2% of $K_2O$;
7% of $ZrO_2$;
1% of $La_2O_3$.

The glass composition according to the invention may appear as a powder or else as a solid block.

The invention also relates to a method for assembling at least two parts, in which the following successive steps are carried out:
the parts are put into contact with a glass composition according to the invention, as it was defined above;
the assembly formed by the parts and by the glass composition is heated to a temperature that is sufficient to melt the glass composition so as to form a gasket between the parts;
the assembly formed by the parts and the gasket is cooled.

According to a first embodiment, the step of putting the parts into contact with the glass composition is carried out by forming a powder of the glass composition, by suspending this powder in an organic binder so as to obtain a slurry or paste, and by coating at least one surface of the part to be assembled with the obtained slurry or paste.

According to a second embodiment, the step of putting the parts into contact with the glass composition is carried out by preparing a glass part having the shape of the gasket to be formed and then by placing this part between the surfaces of the parts to be assembled.

Advantageously, said glass part may be prepared by compacting and then sintering a powder of the glass composition in a mold compliant with the shape of the glass part.

Or else, said glass part may be a solid glass block prepared by direct casting of the molten glass composition into a mold compliant with the shape of the glass part.

By operating according to this second embodiment of the contacting operation in particular when this glass part is a solid glass block, it was found that crystallization inside the gasket was quasi inexistent and that the gasket retained its glassy characteristics during operation.

Advantageously, the parts to be assembled may be made of a material selected from metals; metal alloys; ceramics; and composite materials comprising several among the aforementioned materials.

Advantageously, said at least two parts to be assembled may be in different materials.

Advantageously, said at least two parts to be assembled may be parts of a high temperature electrolyzer HTE or of a high temperature fuel cell SOFC.

The invention further relates to a gasket which may be obtained by the method described above.

The invention also relates to an assembly which may be obtained by the method described in the foregoing.

The invention finally relates to a high temperature electrolyzer or a high temperature fuel cell comprising such an assembly.

The invention will be better understood upon reading the detailed description which follows, given as an illustration and not as a limitation in connection with the appended drawings, wherein:

The glasses <<JV36>>, <<JV38>>, <<VsC33>> and <<VsC34>> are the following compositions in molar percentages:

<<JV36>>:
72.3% of $SiO_2$;
7.8% of $B_2O_3$;
14% of $Na_2O$;
5.9% of $Al_2O_3$.

<<JV38>>:
74.3% of $SiO_2$;
7.8% of $B_2O_3$;
12% of $Na_2O$;
5.9% of $Al_2O_3$.

<<VsC33>>:
74.9% of $SiO_2$;
12.9% of $Na_2O$;
4.2% of $K_2O$;
7% of $ZrO_2$;
1% of $La_2O_3$.

<<VsC34>>:
66% of $SiO_2$;
5.1% of $B_2O_3$;
13.4% of $Na_2O$;
4.4% of $K_2O$;
10.1% of $ZrO_2$;
1% of $La_2O_3$.

On this graph, viscosity is also plotted versus temperature for a commercial glass Schott® 8422 (■ points, curve E) which has the following composition in molar percentages:

69.8% of $SiO_2$;
7.8% of $B_2O_3$;
12.0% of $Na_2O$;
4.1% of $K_2O$;
0.4% of CaO;
0.2% of BaO.

Log η (dPa·s) is plotted in ordinates and the temperature T (in ° C.) is plotted in abscissae.

FIG. 6 shows photographs taken with a scanning electron microscope (SEM) of the interface between two glass compositions (A) according to the invention designated as <<JV36>> and as <<JV38>> and a commercial glass Schott® 8422 on the one hand and materials of an electrolyzer, after a test under an oxidizing atmosphere at the operating temperature (800° C.).

Figure 6A:
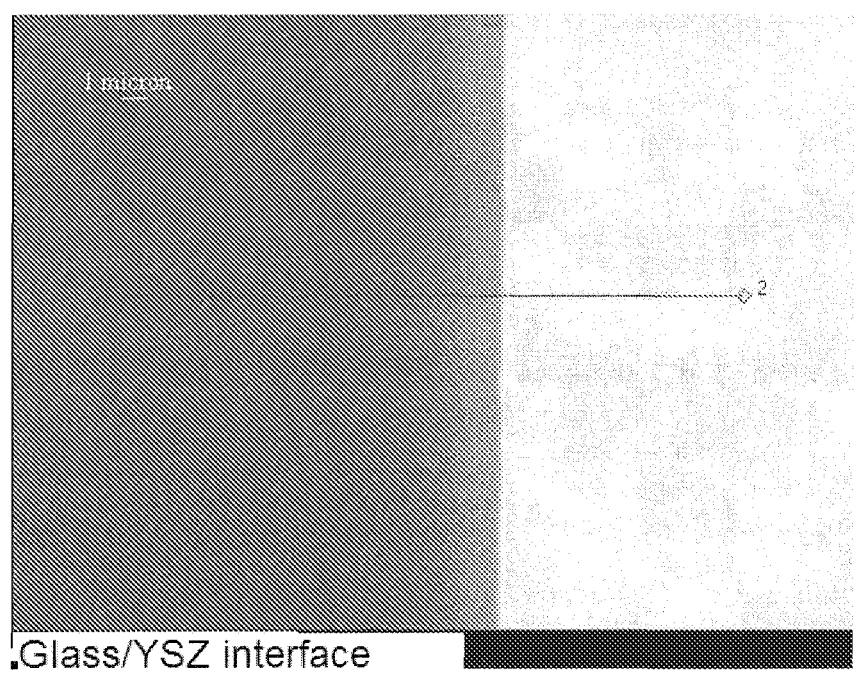

FIG. 6A is a photograph taken with a SEM of the interface between the glass <<JV36>> according to the invention and the YSZ ceramic after 100 hours of operation at 800° C. In FIG. 6A, the scale on the top left represents 1 µm.

Figure 6B:
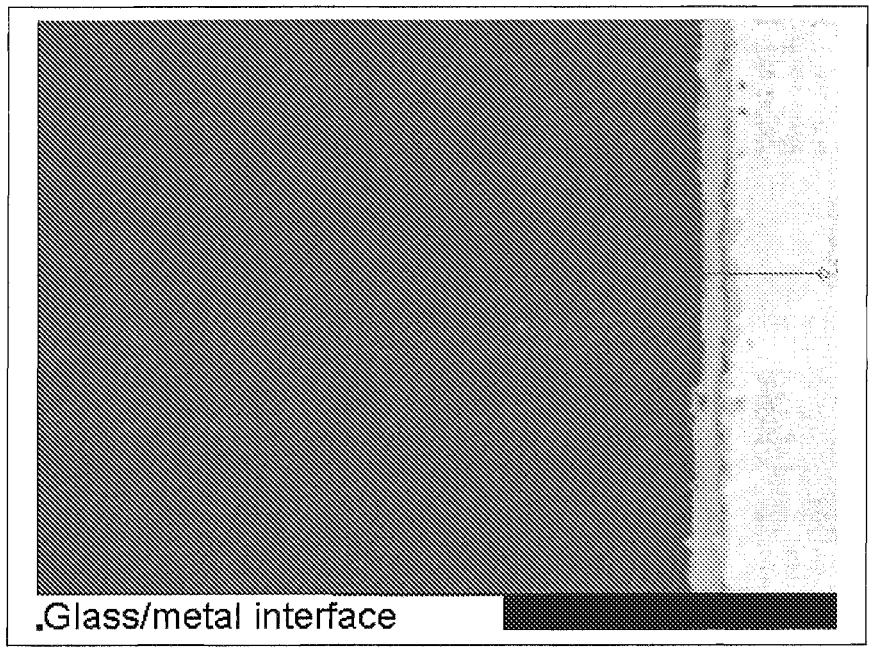
Figure 6C:
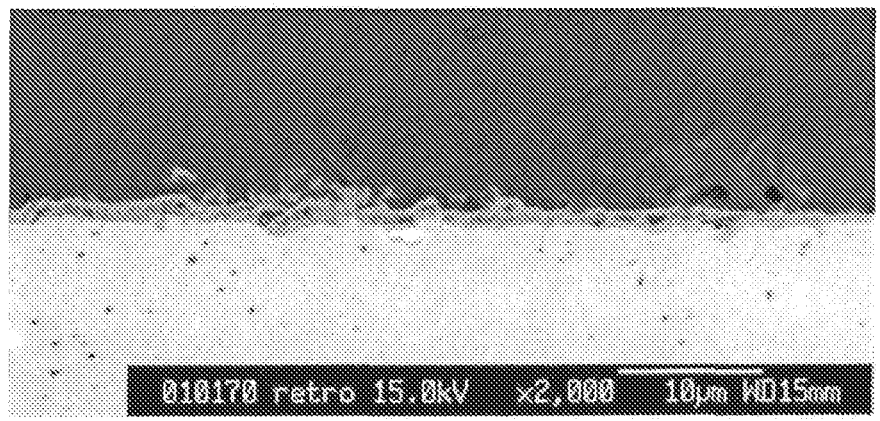

FIGS. 6B and 6C are photographs taken with a SEM of the interface between the glass <<JV38>> according to the invention and CROFER®, after 100 hours and 720 hours of operation at 800° C., respectively. In FIG. 6C, the scale represents 10 µm.

Figure 6D:
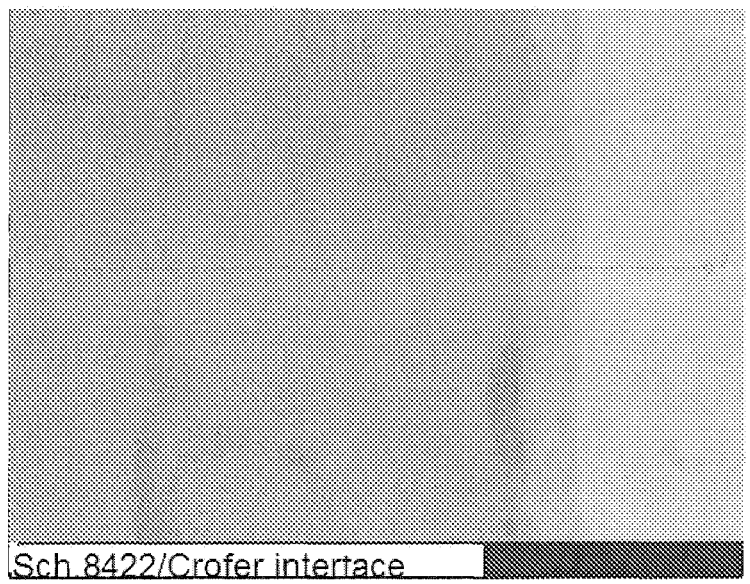
Figure 6E:
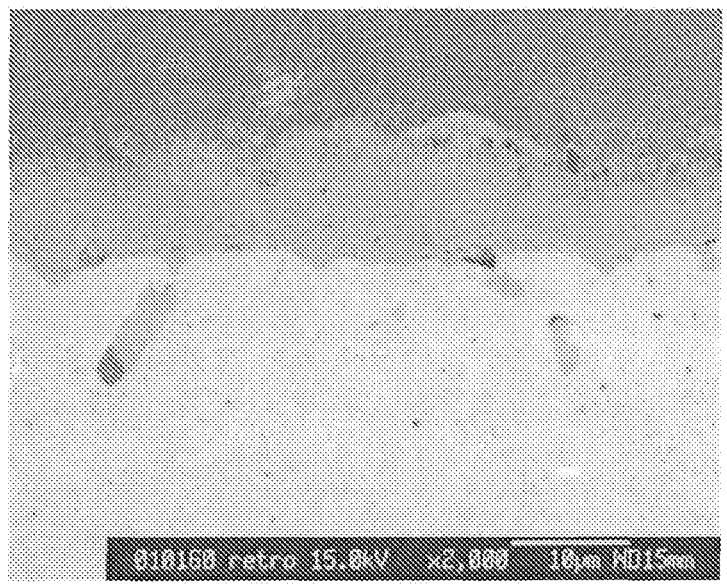

FIGS. 6D and 6E are photographs taken with a SEM of the interface between the glass Schott® 8422 and CROFER®, after 100 hours and 720 hours of operation at 800° C. respectively. In FIG. 6D, the scale on the top left represents 1 µm and in FIG. 6E the scale represents 10 µm.

Figure 6F:
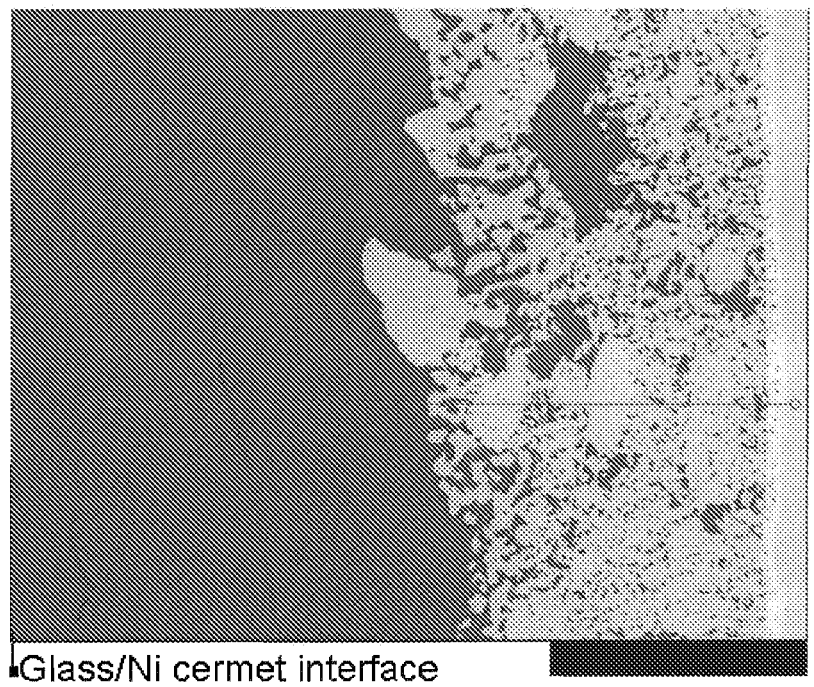

FIG. 6F is a photograph taken with a SEM of the interface between the glass <<JV36>> according to the invention and a Ni cermet which is an electrolyte.

Figure 7:
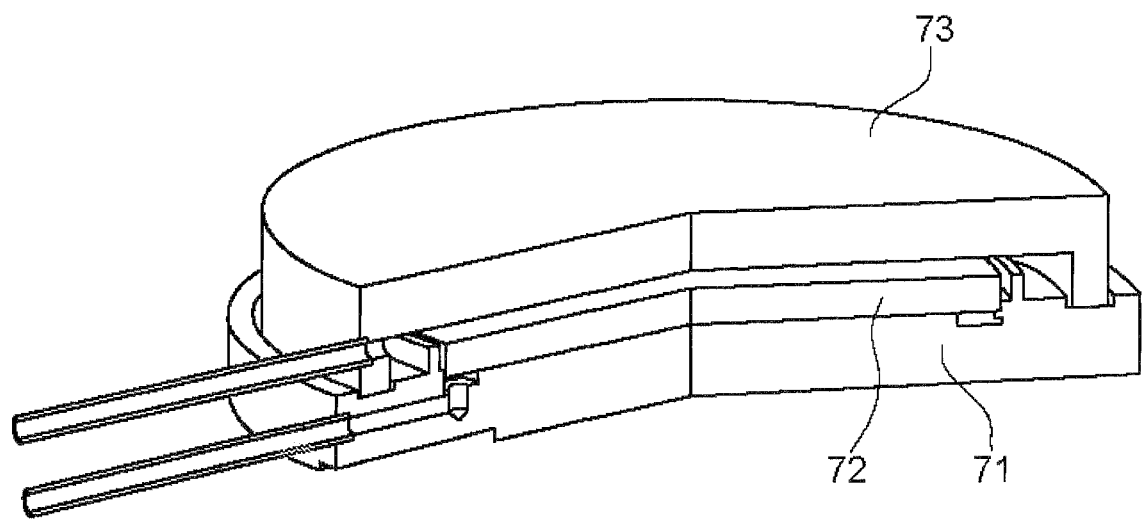

FIG. 7 is a schematic view of the assembly for applying pressure in order to conduct out seal tests on the glasses according to the invention and on the Schott® 8422 glass.

Figure 8:
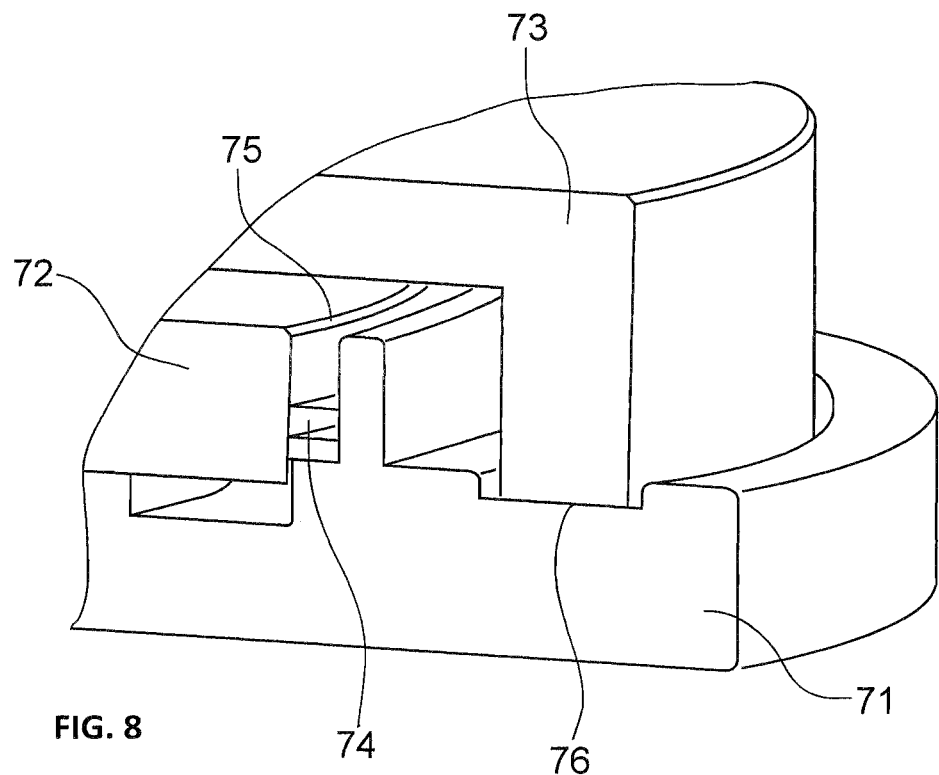

FIG. 8 is a schematic view which shows the detail of the locations of the gaskets in the assembly for applying pressure of FIG. 7.

Figure 9:
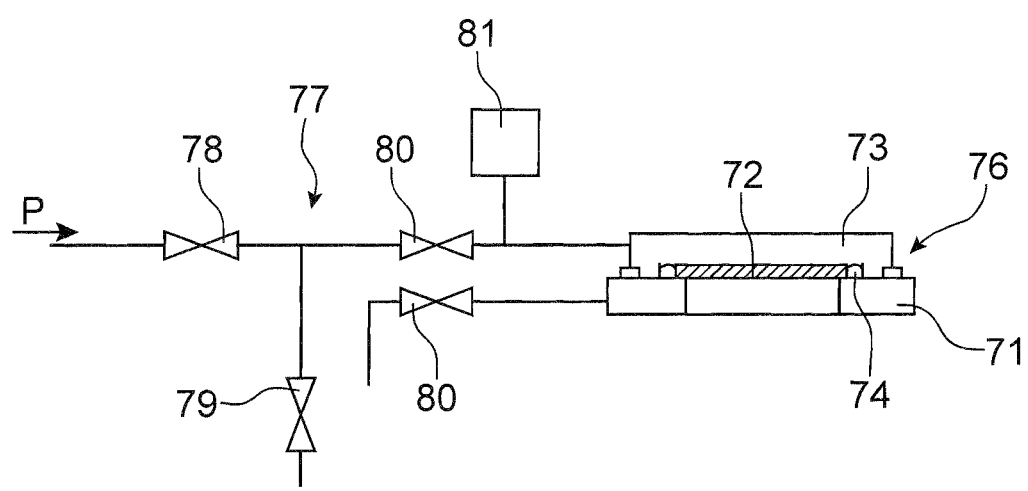

FIG. 9 is a schematic vertical sectional view of the whole of the assembly used for conducting seal tests on glasses according to the invention and on the Schott® 8422 glass.

Figure 10:
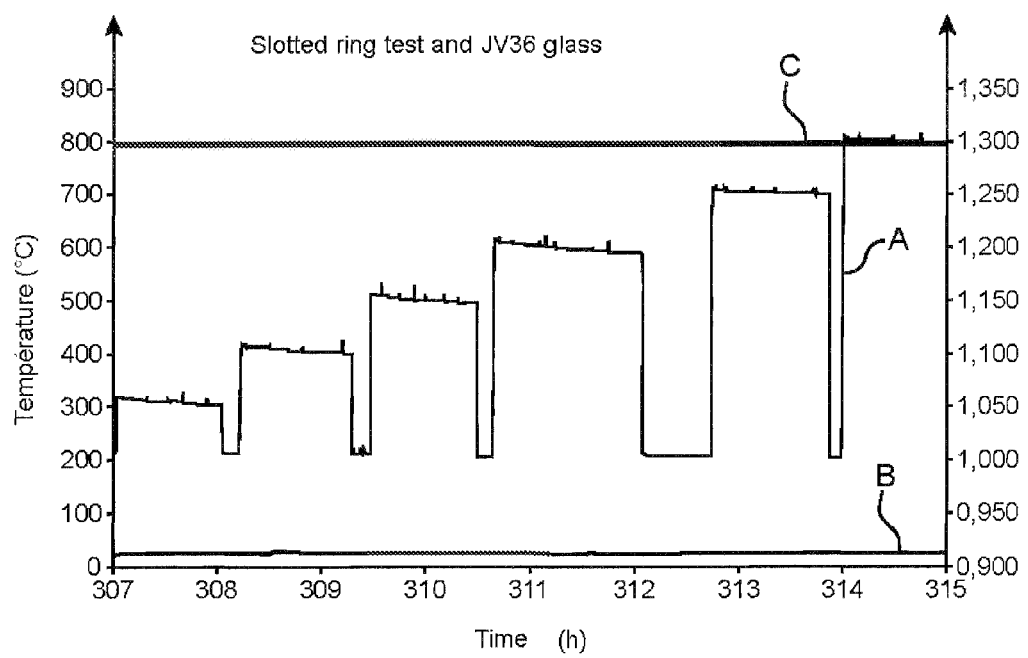

FIG. 10 is a graph which represents the recording of the pressure drops during a test with a slotted ring conducted in the assemblies of FIGS. 7, 8 and 9.

The time (hours) is plotted in abscissae and the temperature (on the left in ° C.) and the pressure (on the right in bars) are plotted in ordinates.

Curve A represents the pressure (in bars), the lines B and C represent the room temperature (in ° C.) and the temperature of the assembly (in ° C.), respectively.

Figure 11A:
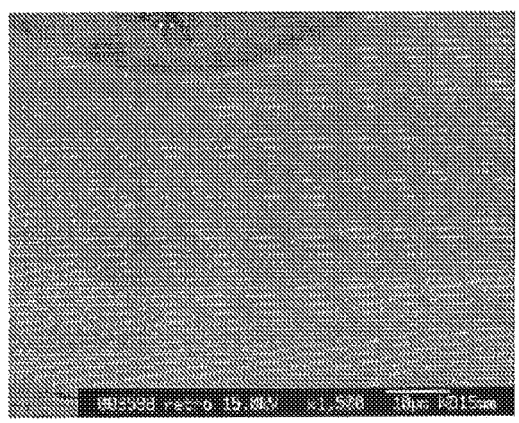
Figure 11B:
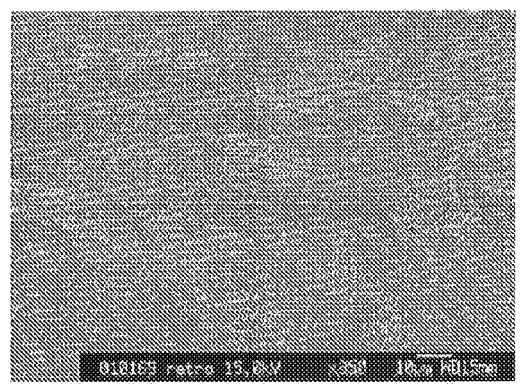

FIG. 11 shows photographs taken with a scanning electron microscope of a gasket prepared with a <<JV38>> glass slip, slurry, according to the invention, after a heat treatment at 800° C. for a duration of 100 hours (FIG. 11A) or for a duration of one month (FIG. 11B).

Figure 12:
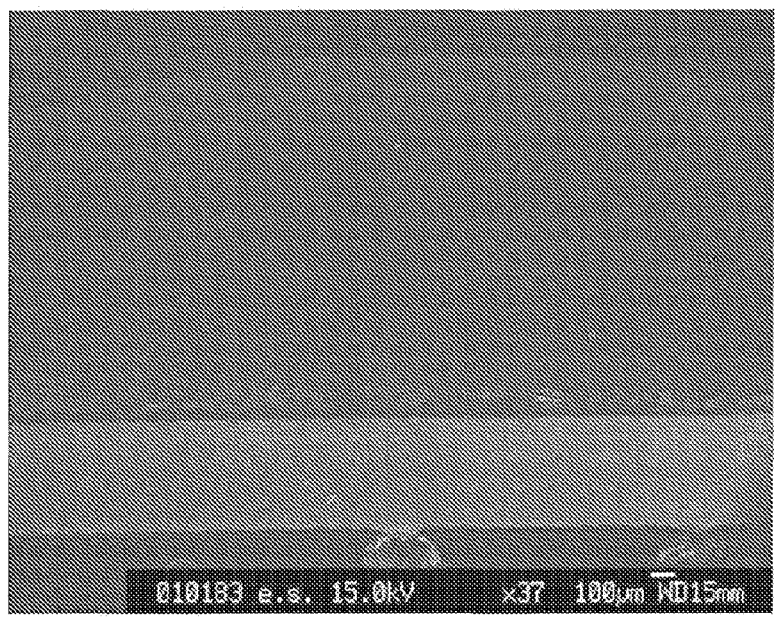

FIG. 12 is a photograph taken with a scanning electron microscope of a gasket in solid form prepared by direct casting from a block of <<JV38>> glass according to the invention, after heat treatment at 800° C. for one month.

Figure 13:
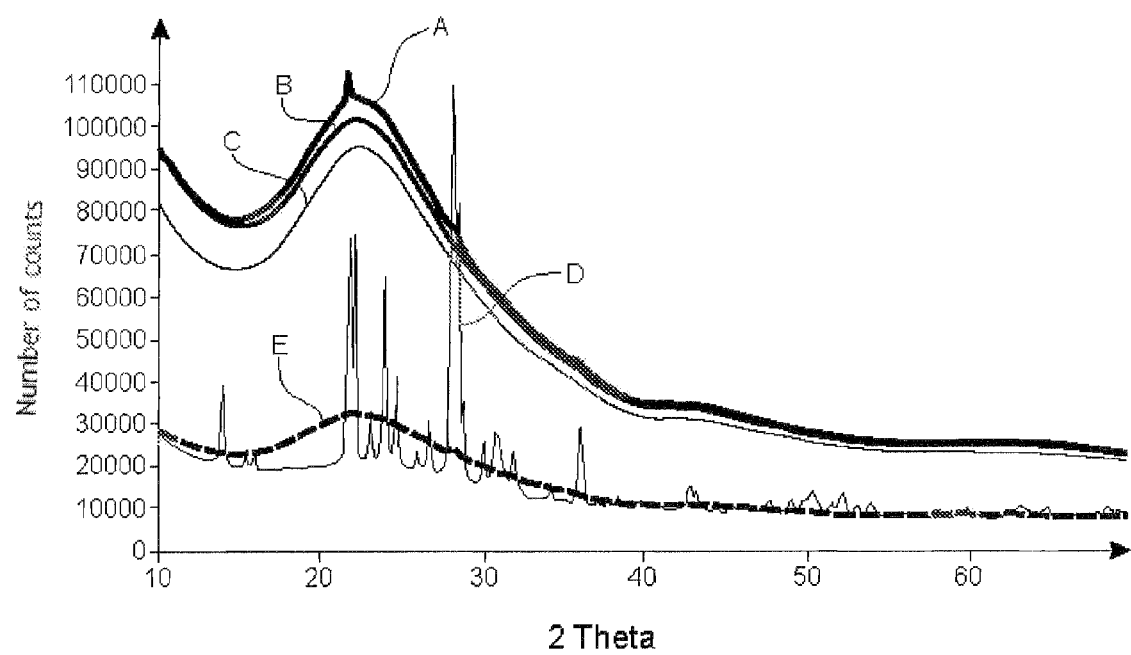

FIG. 13 is a graph which shows the XRD patterns of a gasket prepared from a <<JV38>> glass slip, slurry, according to the invention, treated at 800° C. for 100 hours (curve A), or treated at 800° C. for one month (curve D); from the initial crude <<JV38>> glass (curve B), of a gasket in solid form prepared by direct casting from a block of <<JV38>> glass according to the invention, treated at 800° C. for 100 hours, (curve C), or treated at 800° C. for one month (curve E).

2θ is plotted in abscissae and the number of counts is plotted in ordinates.

FIG. 14 is a diagram which shows the procedure for shaping a gasket by direct casting into a gasket groove preform.

Figure 14A:
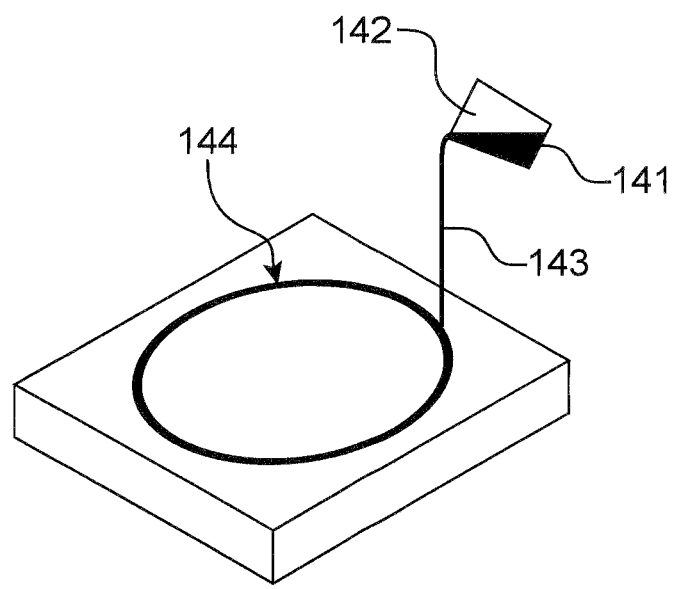
Figure 14B:
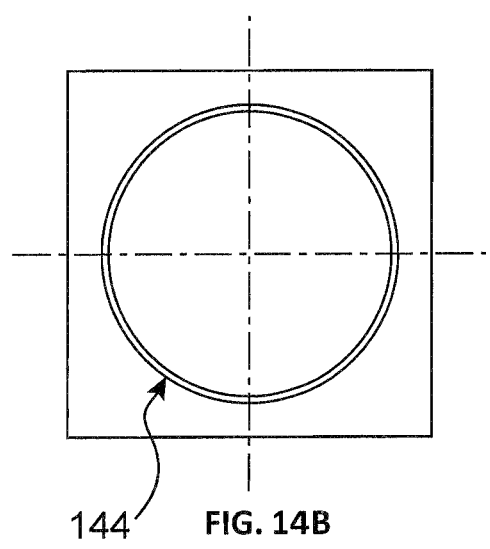

FIG. 14A illustrates the casting operation and FIG. 14B is a view of the gasket groove preform from below.

DETAILED DESCRIPTION OF THE PREFERRED EMBODIMENT

The first step of the method according to the invention first of all generally consists in preparing, elaborating a glass composition.

The glass composition according to the invention is either composed of silica ($SiO_2$), boric anhydride ($B_2O_3$), alumina ($Al_2O_3$), and $Na_2O$ (Glass Composition A), or of silica ($SiO_2$), zirconium oxide $ZrO_2$, boric anhydride ($B_2O_3$), lanthanum oxide ($La_2O_3$), $Na_2O$, and $K_2O$ (Glass Composition B). The molar proportions and the preferred molar proportions of each of the constituents in these compositions A and B have been mentioned above.

The glass composition according to the invention is, according to a first embodiment, a powder composition, which may be prepared first of all by synthesizing from different pure oxides and/or compounds composed of several of these oxides, a glass containing these oxides.

An example of such a compound, composed of several oxides is mullite which is the compound $3Al_2O_3$—$2SiO_2$.

These pure oxides or compounds are generally in the form of powders. They are weighed with observance of the intended proportions in the final glass composition which is desirably obtained, and then they are mixed and milled, ground, in any adequate apparatus, such as a mortar.

The mixture of milled powders is then introduced into a crucible, generally made of platinum, and the different constituents of the mixture of powders are melted by subjecting them for example to a plateau of two hours in air at 1,500° C. or 1,600° C. depending on the glass composition. After cooling, a homogeneous glass is obtained, the glass transition temperature of which generally varies between 540° C. and 680° C. depending on its composition.

The obtained glass is recovered, and then milled in a mortar or any other adequate device in order to obtain a powder with adequate grain size, the grains of which have a size, for example a diameter, for example from 5 to 250 μm, preferably from 10 to 100 μm, notably 63 μm.

The milled, ground, glass is then conventionally mixed with a liquid organic binder or cement generally both viscous and tacky in order to obtain a glass slurry, paste, a so-called <<slip>>, allowing homogeneous spreading onto the surfaces of the substrates to be assembled, between which a sealed gasket has to be made.

In other words, the mixture of the glass and of the binder generally has the consistency of a malleable slurry, paste, easy to spread out in the often narrow grooves which have to accommodate the gaskets.

The binder generally comprises one or more binding compounds such as Terpineol or polyvinyl butyral and one or more solvents such as ethanol.

The suspension, slurry, paste of the glass composition described earlier, is spread out, coated, applied, preferably homogeneously on the surface of at least one of the parts to be assembled and the surfaces of both parts to be assembled are then put into contact. This brazing configuration is called a <<sandwich configuration>> since the slurry, paste, of the brazing composition is directly placed between the surfaces of the parts to be assembled.

The amount of slurry, suspension, paste of brazing composition to be applied in this configuration is generally of the order of 0.1 to 0.4 $cm^3$ of slurry, paste, per $cm^2$.

Or else, the surfaces of the parts to be assembled are brought closer so as to leave a gap generally from 1 to 500 μm which will be filled by a capillarity effect with the brazing composition, the latter being positioned close to the gap to be filled in a space or reservoir made for this purpose, said reservoir may have millimetric dimensions according to the knowledge of man skilled in the art in this field.

This brazing configuration is called a <<capillary configuration>>. With the brazing compositions according to the invention, it is possible to perform such a capillary brazing, i.e. infiltration of the brazing material into the brazing joint, without directly positioning the brazing composition between the parts to be assembled like in the case of the <<sandwich configuration>>.

The amount of slurry, composition, paste, of brazing composition to be applied in this capillary configuration is generally of the same order as the one indicated above.

Or else, the glass powder obtained as described above may be compacted and sintered in a mold or preform for example made of graphite, with a suitable shape corresponding to the shape of the gasket which is desirably obtained. This mold or this preform may for example include a slot or groove, the shape of which is that of the groove into which the gasket will have to fit. A sintered glass part is thereby obtained which is removed from the mold and which is then placed between the parts to be assembled.

The glass composition according to the invention may appear no longer as a powder but as a solid block.

Let us specify that a powder generally consists of discrete particles, the dimension of which, for example the average diameter, may range from 5 μm to 250 μm while a solid block generally has a size defined by its largest dimension from 1 to 50 cm.

This solid block may be melted and the molten glass may be directly cast into a mold or preform for example made of graphite, with a suitable shape corresponding to the shape of the gasket which is desirably obtained. This mold or this preform may for example include a slot or groove, the shape of which is that of the groove into which the gasket will have to be fitted. A glass part is thereby obtained in the form of a solid glass block which is removed from the mold and which is then placed between the parts to be assembled.

The preparation, shaping of a gasket in a solid form, i.e. in the form of a glass block, as cast, is described in FIG. 14.

Molten glass (141) having a composition according to the invention and contained in a crucible (142), is directly cast (143) into a preform of a gasket groove (144) made of graphite (FIG. 14A).

FIG. 14B is a view of the preform from below, shown as a perspective view in FIG. 14A. The shown gasket groove is circular, but other shapes may be contemplated.

The embodiments in which a glass part prepared from sintered compacted glass or a solid glass part, as cast, are placed between the parts to be assembled, are particularly advantageous since they give the possibility of limiting the crystallization phenomenon promoted by the use of gaskets prepared from powders and which occurs during the maintaining of this gasket at high temperatures, for example from 700° C. to 900° C., and therefore of preserving the essentially glassy nature of the gasket at these high temperatures.

The second step of the method according to the invention generally consists of carrying out the assembling operation, strictly speaking.

Before assembling, and generally before coating the surfaces to be assembled with a slurry, paste, of the glass composition, or else before placing a part in sintered compacted glass or in solid glass, the two (or more) surfaces of the parts to be assembled are generally degreased in an organic solvent for example of the ketone, ester, ether, alcohol type or a mixture thereof; and then dried.

The parts to be assembled are generally two in number, but it is also possible to assemble simultaneously a larger number of parts, which may range up to 100.

According to the invention, it is possible to assemble, with excellent results every time, parts with a complex geometry, shape and/or of large size.

The two or more parts to be assembled may be made of the same material, or else they may be made of different materials. This is one of the advantages of the composition according to the invention, allowing the assembling of very different materials, notably materials for which the thermal expansion coefficients are very different.

The parts to be assembled may be made of a material selected from metals and alloys such as steels, and nickel alloys; cermets; ceramics; and composite materials comprising several of the aforementioned materials.

The preferential application of the glass compositions according to the invention is the assembling of various constitutive elements of an <<HTE>> or a <<SOFC>> and the materials which may be assembled with the method according to the invention by applying the composition according to the invention, will preferably be selected from the materials which make up the different elements of these apparatuses.

Thus, the preferred materials for the <<HTE>> cathode (anode in the <<SOFC>> mode) and the <<HTE>> anode (cathode in the <<SOFC>> mode) are the nickel oxide-ceria gadolinia oxide (NiO-CGO) cermet and the lanthanum strontium manganite ($La_{1-x}Sr_xMn_yO_{3-\delta}$ or LSM), respectively.

These are materials which are used most commonly today industrially in the <<SOFC>> mode, but many other materials and combinations may be contemplated, such as the NiO-YSZ cermet, nickelates ($La_4Ni_3O_{10}$, $La/Nd_2NiO_4$), chromomanganites (LaCeSrCrMnO), ferrites ($La_{1-x}Sr_xFe_yO_{3n+2-\delta}$), cobaltites ($La_{1-x}Sr_xCo_yO_{3-\delta}$) or titanates ($La_4Sr_{n-4}Ti_nO_{3n+2-\delta}$).

The parts ready to be assembled are then positioned in a heating device such as an oven or subject to heating by any other adequate means.

The assembling may be carried out in an air atmosphere.

The parts to be assembled are subjected for example in an oven to a heating thermal cycle, generally in an air atmosphere.

Thus, the assembly formed by the parts and the glass composition (slurry, paste, sintered compacted part or solid part) may be brought to the brazing temperature (brazing plateau) by observing a preferably <<slow>> rise in temperature with one or several temperature ramps from room temperature.

This rise in temperature may for example be accomplished with a temperature ramp at a rate of 0.5° C. per minute.

The brazing plateau is generally carried out at a temperature corresponding to a softening condition of the glass where its viscosity is of the order of $10^5$ dPa·s, but this temperature is preferably a temperature at least greater by 300° C. than the glass transition temperature.

This so-called <<brazing>> temperature is a temperature which is a sufficient temperature allowing formation of the joint between the interfaces, i.e. the wetting of the molten glass composition on the surfaces of the materials making up the parts to be assembled.

According to the compositions, the brazing temperature will therefore vary for example from 850° C. to 1,000° C.

With such a melting temperature of the compositions, it is possible, according to another advantage of the method of the invention, to use the assembly notably in air for example up to 800° C. and even up to 900° C.

The brazing time, i.e. the thermal cycle for producing the assembly is generally from 1 to 10 hours.

At the end of the brazing cycle, following the brazing plateau, the assembly is cooled down to the temperature of use i.e. 700° C. to 900° C., at a rate for example of 0.5° C. per minute.

During the cooling, the glass composition solidifies and a solid gasket is formed.

The assemblies of parts including gaskets prepared by the method according to the invention give the possibility of making structures, apparatuses, components of complex shapes having high temperatures of use which may generally range up to 900° C. with great accuracy.

In other words, the method according to the invention may notably be applied to the making of any device, apparatus, structure, component requiring the assembling between at least two substrates, parts by guaranteeing both good mechanical strength and a satisfactory seal at the assembly.

These devices, apparatuses, structures, components may meet needs in various fields but the preferred field to which the invention is applied is that of high temperature electrolyzers and fuel cells.

The invention will now be described by means of the following examples, of course given as an illustration and not as a limitation.

EXAMPLES

In the examples 1 to 3 which follow, the characteristics of two glass compositions (A) according to the invention belonging to the family <<$SiO_2$—$B_2O_3$—$Al_2O_3$—$Na_2O$>>, designated as <<JV36>> and <<JV38>> are determined, which respectively have the following compositions in molar percentages:

<<JV36>>:
72.3% of $SiO_2$;
7.8% of $B_2O_3$;
14% of $Na_2O$;
5.9% of $Al_2O_3$.

<<JV38>>:
74.3% of $SiO_2$;
7.8% of $B_2O_3$;
12% of $Na_2O$;
5.9% of $Al_2O_3$;

and optionally of two glass compositions (B) according to the invention belonging to the <<$SiO_2$—$ZrO_2$—$B_2O_3$—$La_2O_3$—$Na_2O$—$K_2O$>> family designated as <<VsC33>> and <<VsC34>> which respectively have the following compositions in molar percentages:

<<VsC33>>:
74.9% of $SiO_2$;
12.9% of $Na_2O$;
4.2% of $K_2O$;
7% of $ZrO_2$;
1% of $La_2O_3$.

<<VsC34>>:
66% of $SiO_2$;
5.1% of $B_2O_3$;
13.4% of $Na_2O$;
4.4% of $K_2O$;
10.1% of $ZrO_2$;
1% of $La_2O_3$.

And these characteristics are compared with those of the commercial glass Schott® 8422 which has the following composition in molar percentages:

69.8% of $SiO_2$;
7.8% of $B_2O_3$;
12.0% of $Na_2O$;
4.1% of $K_2O$;
0.4% of CaO
0.2% of BaO.

Example 1

In this example, measurements of viscosity are carried out for both glasses (A) according to the invention described above, designated as <<JV36>> and <<JV38>> and for the two glasses (B) according to the invention described below, designated as <<VsC33>> and <<VsC34>> and for the comparative glass Schott® 8422.

These measurements were carried out in two ranges of temperatures, (550° C.-700° C.) and (1,000° C.-1,500° C.) which were correlated through a law of the VFT type $$\left(\log \eta = A + \frac{B}{T - T_0}\right).$$

Figure 1:
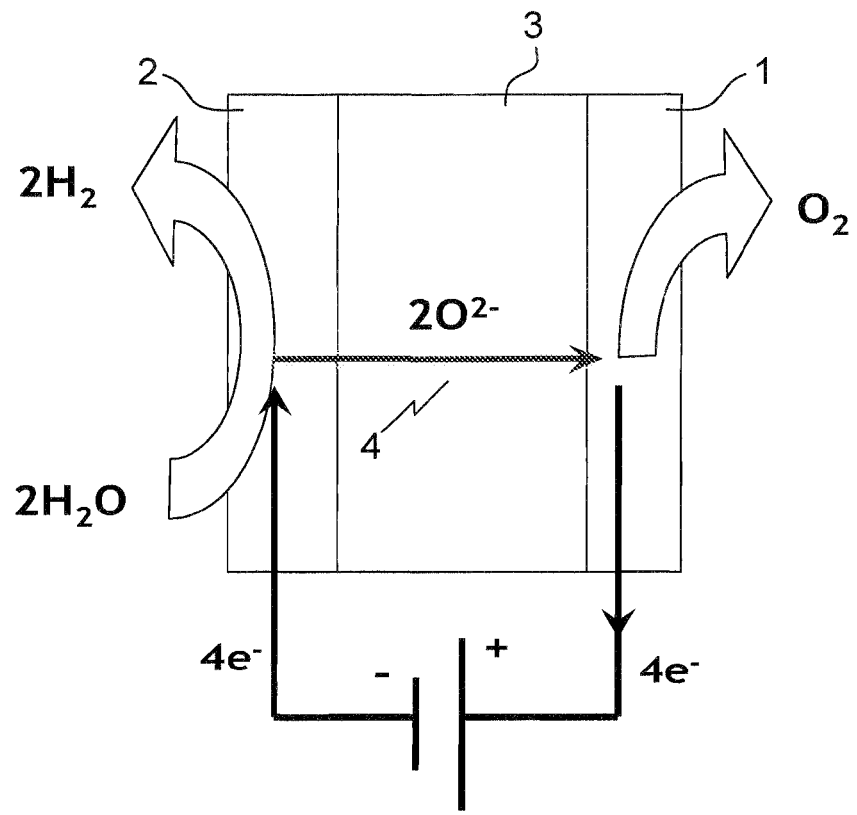
FIG. 1 is a schematic vertical sectional view of an elementary cell of a high temperature electrolyzer (HTE)
Figure 2:
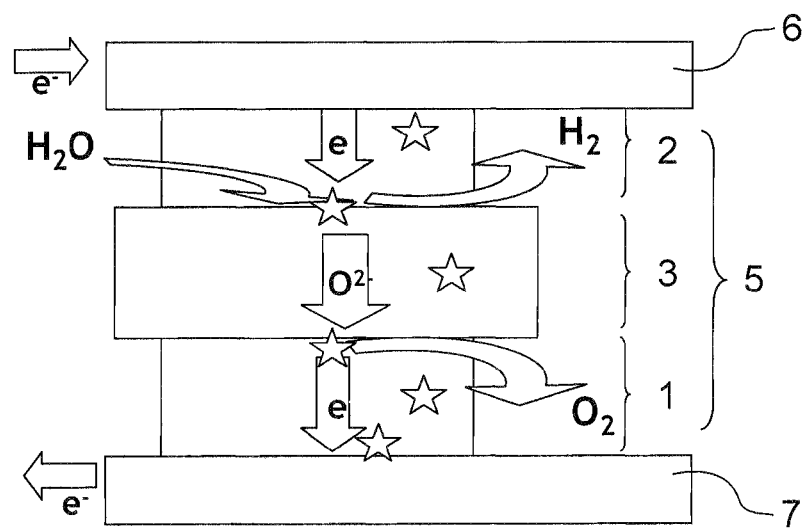
FIG. 2 is a schematic vertical sectional view of an elementary reactor or elementary module of a high temperature electrolyzer (HTE)
Figure 3:
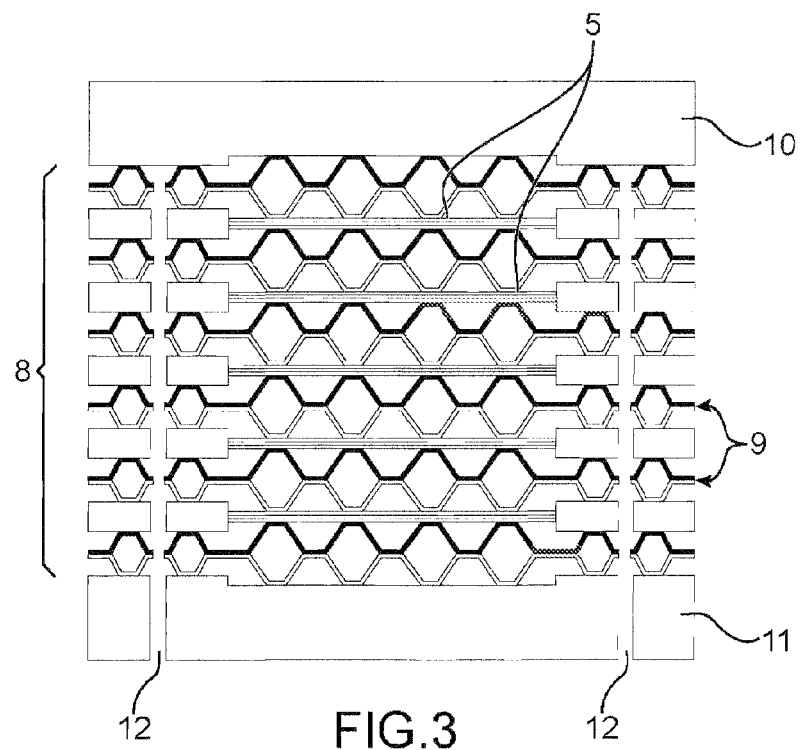
FIG. 3 is a schematic vertical sectional view of a conventional high temperature electrolyzer comprising a stack of elementary modules.
Figure 4:
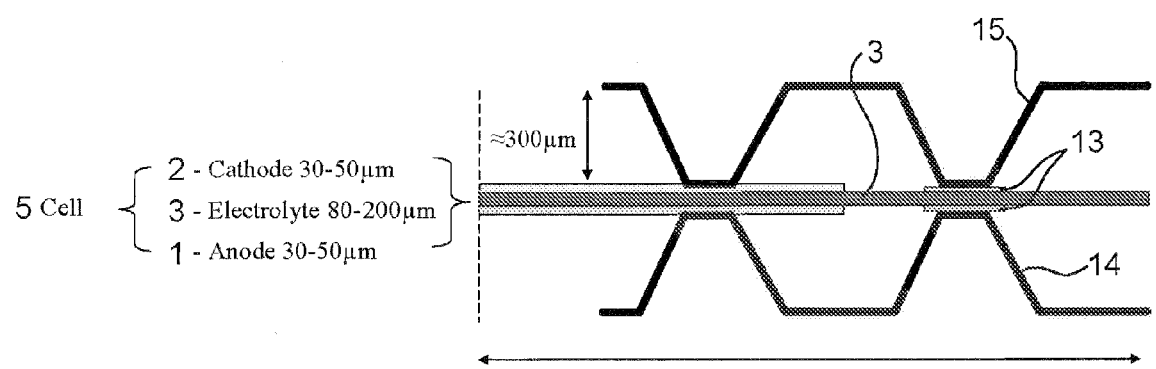
FIG. 4 is a schematic vertical sectional view of an elementary module of a conventional high temperature electrolyzer which shows the sealed gaskets, seals between the cell and the lower and upper interconnectors.
Figure 5:
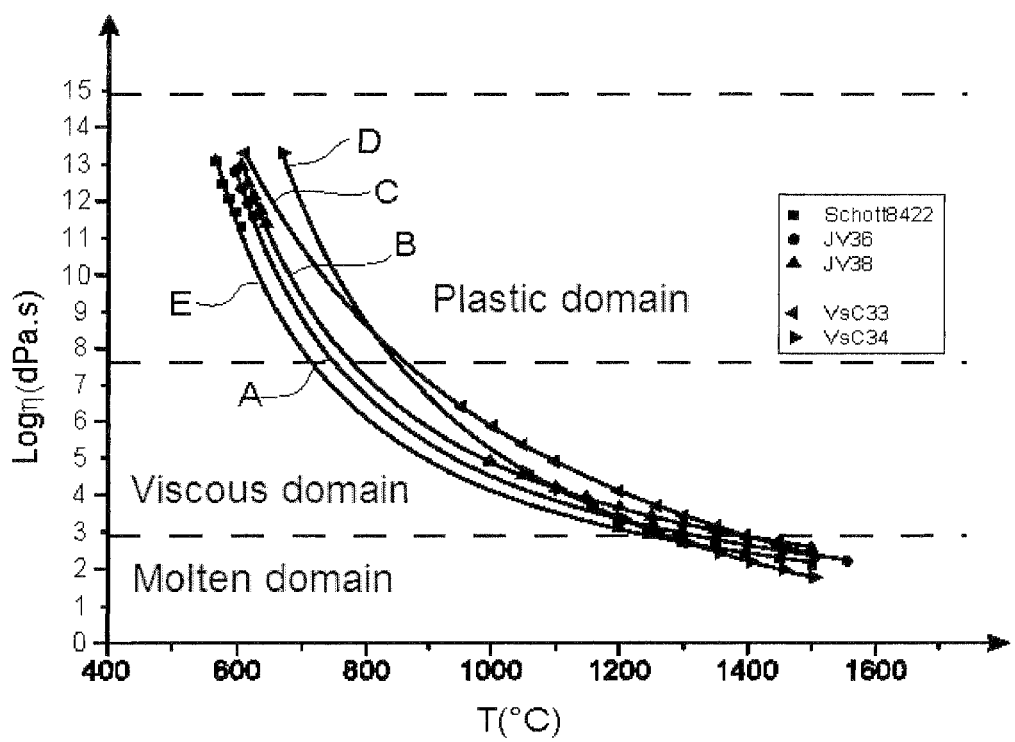
FIG. 5 is a graph which gives the viscosity versus temperature of two glass compositions (A) according to the invention designated as <<JV36>> (● points, curve A) and <<JV38>> (▲ points, curve B), and of two glass compositions (B) according to the invention designated as <<VsC33>> (◄ points, curve C) and as <<VsC34>> (► points, curve D).

In FIG. 5 in which the plastic, viscous and molten domains of the glasses are illustrated, it is noted that in the range from 700° C. to 850° C. which is the operating range currently used in apparatuses such as high temperature electrolyzers or high temperature fuel cells, the glasses <<JV36>> and <<JV38>> according to the invention have a visco-plastic behavior giving the gasket an optimum combination of flexibility and rigidity.

This is also the case of the glasses VsC33 and VsC34.

In particular, at 800° C., the viscosity of the <<JV36>> and <<JV38>> glasses according to the invention is located between $10^7$ and $10^8$ dPa·s.

Example 2

In this example, the interactions of the glass compositions according to the invention and of the Schott® 8422 glass with various materials making up an electrolyzer at the operating temperature, i.e. 800° C., and for a period of 100 hours in an oxidizing atmosphere, are investigated.

These tests are conducted in the laboratory with samples of materials representative of the electrolyzer, on which a small amount of glass slurry, paste is positioned, applied in the same way as for the tests on the prototypes of electrolyzers. The glass/metal and glass/ceramic samples are treated in air in a muffle furnace.

The interface is then observed with a scanning electron microscope (SEM).

Study of the Interaction of the <<JV36>> Glass with the <<YSZ>> Ceramic for 100 Hours at 800° C. in an oxidizing atmosphere.

FIG. 6A is a photograph taken with an SEM of the interface between the <<JV36>> glass according to the invention and the YSZ ceramic after 100 hours of operation at 800° C.

It is observed that no intermediate phase is observed at the interface.

Study of the Interaction of the <<JV36>> Glass with CROFER® Respectively During 100 Hours and 720 Hours at 800° C., in an Oxidizing Atmosphere.

FIGS. 6B and 6C are photographs taken with an SEM of the interface between the <<JV38>> glass according to the invention and CROFER®, after 100 hours and 720 hours of operation at 800° C., respectively.

It is observed in FIGS. 6B and 6C that the thicknesses of chromium oxide formed at the interface are 0.75 µm (for 100 hours) and 2 µm (for 720 hours), respectively.

Study of the Interaction of the Schott® 8422 Glass with CROFER® for 100 Hours and 720 Hours at 800° C. Respectively in an Oxidizing Atmosphere.

FIGS. 6D and 6E are photographs taken with an SEM of the interface between the Schott® 8422 glass and CROFER®, after 100 hours and 720 hours of operation at 800° C., respectively.

In these figures it is seen that the thicknesses of chromium oxide formed at the Schott® 8422/CROFER® interface which are 4 µm (for 100 hours) and 15 µm (for 720 hours), respectively, are clearly larger than those at the <<JV38>> glass according to the invention/CROFER® interface.

FIG. 6F is a photograph taken with an SEM of the interface between the <<JV36>> glass according to the invention and an Ni cermet which is an electrolyte.

This photograph shows that the glass according to the invention penetrates into all the porosities of this Ni cermet without any damage.

This example shows that the interactions between the glasses according to the invention and diverse materials of high temperature electrolyzers are much smaller than the interactions between the Schott® glass and the same materials.

Example 3

In this example, seal tests are conducted by measuring the pressure drop on the Schott® 8422 glass and on the <<JV36>> glass according to the invention.

The assembly for exerting pressure used for these measurements is schematized in FIG. 7.

The assembly essentially consists of 3 portions:
a metal sole (71) for example made of steel;
a ceramic disk or sole (72) simulating the cell;
a metal bell (73).

As this may be seen in FIG. 8, the test gasket is the internal gasket (74), deposited in the groove formed by a portion of the metal sole and the flank (75) of the ceramic disk. The so-called constraint gasket (76) allows the upper portion of the assembly to be sealed and pressure to be applied for the seal test of the internal gasket (74).

The assembly of FIG. 7 is positioned in a circuit for applying the pressure fed by an argon circuit (77) comprising adjustment (78), purging (79) and isolating (80) valves and a sensor (81) (see FIG. 9).

The operating procedure of the seal test is the following:
Placement of the gaskets: the gaskets, in the form of a slurry, paste, are placed in the grooves with a syringe over a height of about 2.5 mm (i.e. about 0.3 cm³ of slurry, paste, per cm² for the internal gasket, and about 0.2 cm³ of slurry, paste, per cm² for the constraint gasket);
Conditioning of the gaskets: a preliminary heat treatment is applied in order to form the gaskets (0.5° C. per minute up to the formation temperature $T_{formation}$ (between 850° C. and 1,000° C.), for 1 to 10 hours and then lowering the temperature again at a rate of 0.5° C. per minute);
Setting up the assembly: setting up the bell and the masses on the model, the weight of which varies depending on the overpressure level to be tested (typically between 60 kg and 150 kg for a pressure application of 0.2 bar to 3 bar);

Setting the temperature of the assembly: a rise in temperature at a rate of 0.5° C. per minute up to the test temperature $T_{test}$ (750° C. to 1,000° C.);

Application of pressure to the assembly by applying pressures in steps of 50 mbars up to $P_{test}$, isolation of the circuit and measurement of the pressure drop by means of the pressure sensor. Maintaining the pressure at $P_{test}$ first of all for one hour and then if the seal is a good seal for about one week and recording the pressure drop (FIG. 10);

Cooling down to room temperature at a rate of 0.5° C. per minute.

In FIG. 10 which concerns the slotted ring test conducted with the <<JV36>> glass, the seal test is conducted at the rated temperature (T assembly) of 800° C.: pressure is applied to the circuit in steps of 50 mbars (50 mbars, 100 mbars, 150 mbars, 200 mbars, 250 mbars et 300 mbars), with resetting to $P_{atm}$ between each set value. The circuit is maintained under the pressure of each step for 1 hour during which the pressure drop is measured. For the last step (300 mbars pressure $P_{test}$) and as this was specified earlier, one first begins by maintaining the circuit for one hour at this pressure, and then if the seal is a good seal, it is maintained at this pressure ($P_{test}$) for a week during which the pressure drop is measured.

Leak rates of $10^{-5}$ Pa·m$^3$·s$^{-1}$ at 800° C. under a pressure of 300 mbars and for 166 hours have been measured with the <<JV36>> glass gasket according to the invention.

With the Schott® 8422 glass gasket, the best seal measured at the same temperature is only $2.10^{-3}$ Pa·m$^3$·S$^{-1}$, under 150 mbars.

Example 4

In this example, the properties of glass gaskets shaped in a conventional way from a glass slurry, paste, of the <<JV38>> glass or of solid gaskets shaped by direct casting of the same <<JV38>> glass according to the procedure described in FIG. 14A are compared. The tests are conducted in the laboratory in the same way as in Example 2.

The <<conventional>> shaping method is used for the glass gasket which consists in the preparation of a glass slurry, paste, a so-called <<slip>>, consisting of glass milled to a grain size varying from 0 to 63 μm and of a mixture of different organic binders.

The mass proportions used are 12% of Terpineol, 6% of polyvinyl butyral, 12% of ethanol and 70% of glass powder.

With this slurry, paste, the assembly is made in the following way: the glass slurry is deposited on the following substrates: stainless steel Crofer®, Haynes® 230 alloy, ceramics of the YSZ or Macor® type and the assembly is then heated up to a temperature (800° C. or 900° C.), with a temperature rise ramp of 0.5° C. per minute and then slowly cooled at a rate of 0.5° C. per minute.

During tests for about 100 hours at 800° C., the gasket prepared from the <<slurry>>, "paste", preparation, "slip" of <<JV38>> glass does not crystallize very much (FIG. 11A) on the other hand after being maintained at 800° C. for one month, the gasket develops a crystallized phase of albite (Na(Si$_3$Al)O$_8$) of more than 50% of the volume which is clearly identified in FIG. 11B. The properties of the gasket are then completely modified.

To overcome this problem, the gasket is shaped in solid form according to the procedure described in FIG. 14A. The gasket is therefore formed with a block of <<JV38>> glass, as cast.

After treating this solid gasket at 800° C. for 1 month, crystallization is quasi-inexistent and the gasket retains its glassy characteristics during operation.

In FIG. 12, on the contrary of FIG. 11B, total absence of crystals in the gasket is observed.

Examination of the X-ray diffraction patterns of FIG. 13 confirms the observations performed with the scanning electron microscope.

In FIG. 13, it is observed in particular that the XRD pattern of the gasket prepared from a glass slip, treated for one month at 800° C. has the characteristic peaks of the crystallization of a phase NaSi$_3$AlO$_8$. The diagrams of the initial crude glass and those of the gaskets composed of a solid glass block prepared by direct casting, treated for 100 hours or one month at 800° C. do not have such peaks, which show that the gaskets retain their initial glassy characteristics and do not crystallize, even after extended treatment at a high temperature.

REFERENCES

[1] Zheng R. et al., Journal of Power Sources, 128 (2004), 165-172.
[2] Eichler K. et al., Journal of the European Ceramic Society, 19 (1999), 1101-1104.
[3] Loehman R. et al., Brow R. *"Engineered Glass Composites for Sealing Solid Oxide Fuel Cells"* SECA Core Technology Program Review, May 11-13, 2004 Boston, USA.
[4] U.S. Pat. No. 4,921,738.
[5] W0-A1-96/05626.
[6] U.S. Pat. No. 6,430,966.
[7] Yang Z. et al., Solid State Ionics 160 (2003), 213-225.
[8] Lahl N et al., Journal of Material Sciences, 35 (2000), 3089-3096.
[9] W0-A1-99/54131.
[10] W0-A1-2006/069753.
[11] U.S. Pat. No. 6,828,263.
[12] U.S. Pat. No. 5,196,277.

What is claimed is:

1. A glass composition characterized in that it is selected from the group consisting of a glass composition (A) consisting of, in molar percentages:
   72.3% of SiO2;
   7.8% of B2O3;
   14% of Na2O;
   5.9% of Al2O3;
   or:
   74.3% of SiO2;
   7.8% of B2O3;
   12% of Na2O;
   5.9% of Al2O3;
and a glass composition (B) consisting of, in molar percentages:
   63 to 76% of SiO$_2$;
   5 to 12% of ZrO$_2$;
   0 to 12% of B$_2$O$_3$;
   0 to 2% of La$_2$O$_3$;
   11 to 14% of Na$_2$O;
   3 to 5% of K$_2$O.

2. The composition of claim 1, wherein said composition only consists of a glassy phase.

3. The composition of claim 1, wherein the composition comprises 0% by weight of crystalline phase after the composition is maintained at a temperature from 600° C. to 1,000° C. for a duration of more than 1 hour.

4. The composition of claim 1, wherein the composition is a visco-plastic composition and has a viscosity in the range from $10^7$ to $10^8$ dPas in the range from 700° C. to 900° C.

5. The composition of claim 1, wherein the glass transition temperature of composition (A) is from 580° C. to 620° C., and the glass transition temperature of composition (B) is from 600° C. to 680° C.

6. The composition of claim 1, wherein the composition is composition (B).

7. The composition of claim 6, wherein the composition (B) consists of, in molar percentages:
   66% of $SiO_2$;
   5.1% of $B_2O_3$;
   13.4% of $Na_2O$;
   4.4% of $K_2O$;
   10.1% of $ZrO_2$;
   1% of $La_2O_3$
   or:
   74.9% of $SiO_2$;
   12.9% of $Na_2O$;
   4.2% of $K_2O$
   7% of $ZrO_2$;
   1% of $La_2O_3$.

8. The composition of claim 1, wherein the composition appears in the form of a powder or else of a solid block.

9. A method for assembling at least two parts, wherein the following successive steps are carried out:
   a. contacting the parts with a glass composition according to claim 1;
   b. forming an assembly by heating the parts and the glass composition to a temperature that is sufficient to melt the glass composition so as to form a gasket between the parts;
   c. forming the assembly by cooling the parts and the gasket.

10. The method of claim 9, wherein the step of contacting the parts with the glass composition is carried out by forming a powder of the glass composition, by suspending the powder in an organic binder so as to obtain a suspension or slurry, paste, and by coating at least one surface of the parts to be assembled with the obtained suspension, slurry, or paste.

11. The method of claim 9, wherein the step of contacting the parts with the glass composition is achieved by preparing a glass part having the shape of the gasket to be formed and then by placing the part between the surfaces of the parts to be assembled.

12. The method of claim 11, wherein said glass part is prepared by compacting and then sintering a powder of the glass composition in a mold compliant with the shape of the glass part.

13. The method of claim 11, wherein said glass part is a solid glass block prepared by direct casting of the molten glass composition into a mold compliant with the shape of the glass part.

14. The method of claim 9, wherein the parts to be assembled are made of a material selected from the group consisting of metals, metal alloys, ceramics, and composite materials.

15. The method of claim 9, wherein said at least two parts to be assembled are made of different materials.

16. The method of claim 9, wherein said at least two parts to be assembled are parts of a high temperature electrolyzer HTE or of a high temperature fuel cell SOFC.

17. The method of claim 9, wherein a gasket is obtained.

18. The method of claim 9, wherein an assembly is obtained.

19. The method of claim 18, wherein a high temperature electrolyzer or high temperature fuel cell comprise the assembly.

\* \* \* \* \*